(12) United States Patent
Osawa

(10) Patent No.: US 7,224,525 B2
(45) Date of Patent: May 29, 2007

(54) OPTICALLY TRANSMITTING SHEET AND SCREEN

(75) Inventor: Futoshi Osawa, Tokyo-To (JP)

(73) Assignee: Dai Nippon Printing Co. Ltd., Tokyo (JP)

( * ) Notice: Subject to any disclaimer, the term of this patent is extended or adjusted under 35 U.S.C. 154(b) by 146 days.

(21) Appl. No.: 10/937,113

(22) Filed: Sep. 9, 2004

(65) Prior Publication Data
US 2005/0068619 A1 Mar. 31, 2005

(30) Foreign Application Priority Data
Sep. 25, 2003 (JP) ............................. 2003-333640

(51) Int. Cl.
*G03B 21/60* (2006.01)
*G03B 21/56* (2006.01)

(52) U.S. Cl. .................. 359/453; 359/452; 359/457; 359/460

(58) Field of Classification Search ........ 359/452–457, 359/443, 460
See application file for complete search history.

(56) References Cited

U.S. PATENT DOCUMENTS 5,751,478 A * 5/1998 Yoshimura et al. ......... 359/453
5,914,809 A * 6/1999 Mitani et al. ............... 359/457
6,124,969 A * 9/2000 Funazaki et al. ............ 359/456
6,342,929 B1 * 1/2002 Hirata et al. ................ 348/779
6,728,031 B2 * 4/2004 Hirata et al. ................ 359/457
2003/0174396 A1 * 9/2003 Murayama et al. ......... 359/453

FOREIGN PATENT DOCUMENTS

JP 2004-037671 5/2004
JP 2004-219809 5/2004

* cited by examiner

*Primary Examiner*—W. B. Perkey
*Assistant Examiner*—Magda Cruz
(74) *Attorney, Agent, or Firm*—Harness, Dickey, & Pierce, P.L.C.

(57) ABSTRACT

Disclosed are a light transmission sheet and a screen that can realize good color reproduction while suppressing a lowering in light transmittance. The light transmission sheet comprises a light diffusing sheet and/or a colored sheet. The light diffusing sheet and/or the colored sheet comprise light diffusing fine particles dispersed in a light transparent matrix and satisfy formula (1):

Figure 1:
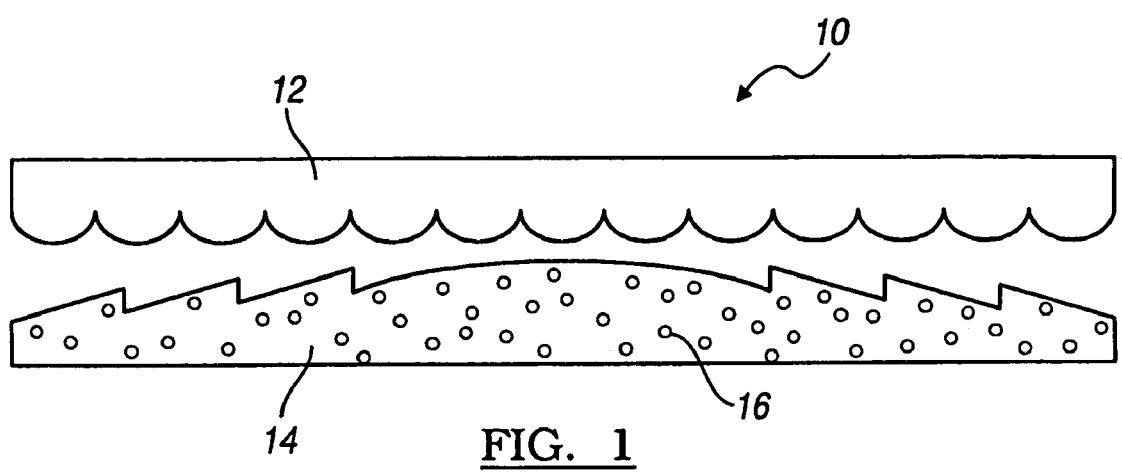

$$-0.5\% \leq T1-T2 \leq 5\% \qquad (1)$$

wherein T1 represents light transmittance at a wavelength of 450 nm, %; and T2 represents light transmittance at a wavelength of 600 nm, %. A light diffusing sheet and/or colored sheet for a screen are also disclosed. The screen comprises the light diffusing sheet and/or colored sheet for a screen.

6 Claims, 1 Drawing Sheet

OPTICALLY TRANSMITTING SHEET AND SCREEN

TECHNICAL FIELD

The present invention relates to a light transmission sheet and a screen. More particularly, the present invention relates to a light diffusing sheet and/or a colored sheet and a screen that are particularly suitable for single light source-type transmission projection televisions such as LCDs (liquid crystal displays) and DMDs (digital micro-mirror devices).

BACKGROUND ART

Three-tube cathode ray tube (CRT) light sources have hitherto been mainly used as light sources for projection televisions. A demand for digitalization, enhanced definition, and compactification in recent years has led to expanded use of single-tube light sources such as LCDs and DMDs. The single-tube light sources such as LCDs and DMDs have advantages over the above CRTs. At the present time, however, the output of the light source does not reach that of CRTs yet.

On the other hand, the projection television should have given color reproduction as displays, and the color temperature is generally set to about 10,000 K. In order to maintain the above color temperature, it is common practice to regulate the light source and the circuit.

The drawing described herein is for illustration purposes only and are not intended to limit the scope of the present disclosure in any way.

FIG. 1 is a cross-sectional view of an exemplary light transmission sheet of the present invention. In the drawing, the various features as discussed throughout the specification are illustrated and identified by the reference numeral as follows: the light transmission sheet 10 comprises a lenticular lens 12 and a light diffusing sheet 14, which in this case is in the form of a Fresnel lens. In addition, the light diffusing sheet 14 includes light diffusing fine particles 16.

DISCLOSURE OF THE INVENTION

Since single light sources are low in light source output, the regulation of the color temperature disadvantageously results in lowered brightness. Therefore, the development of light diffusing sheets and/or colored sheets and screens which can keep the color temperature high while minimizing the necessity of color regulation are desired in the art.

The present inventors have made various studies and, as a result, have found that, when light transmission properties of the light diffusing sheet and/or colored sheet are regulated so as to have a given relationship, the color temperature can be kept high. This has led to the completion of the present invention.

Thus, according to the present invention, there is provided a light transmission sheet comprising a light diffusing sheet comprising light diffusing fine particles dispersed in a light transparent matrix and/or a colored sheet, said light diffusing sheet and/or said colored sheet satisfying formula (1):

$$-0.5\% \leq T1-T2 \leq 5\% \tag{1}$$

wherein T1 represents light transmittance at a wavelength of 450 nm, %; and T2 represents light transmittance at a wavelength of 600 nm, %.

In this light transmission sheet according to the present invention, preferably, a wavelength-selective colorant is dispersed in the light transparent sheet.

In the light transmission sheet according to the present invention, preferably, at least one type of said light diffusing fine particles contained in said light diffusing sheet is inorganic fine particles.

In the light diffusing sheet and/or the colored sheet for a screen according to the present invention, a Fresnel lens is provided on the whole or a part of at least one side of the light diffusing sheet and/or the colored sheet.

According to another aspect of the present invention, there is provided a light diffusing sheet and/or a colored sheet for a screen, which comprise the above light diffusing sheet and/or colored sheet and is used as a lenticular lens.

According to a still another aspect of the present invention, there is provided a light diffusing sheet and/or a colored sheet for a screen, comprising the above light diffusing sheet and/or colored sheet which are provided on the surface of a lenticular lens in its viewer side.

According to a further aspect of the present invention, there is provided a light diffusing sheet and/or colored sheet for a screen that are a light transmission sheet for a front panel which comprises the above light diffusing sheet and/or colored sheet, the light diffusing sheet and/or the colored sheet being further provided on the front surface of a lenticular lens.

According to the present invention, there is also provided a screen comprising the above light diffusing sheet and/or colored sheet for a screen.

According to the present invention, in a light diffusing sheet and/or colored sheet comprising light diffusing fine particles dispersed in a light transparent matrix, when the light diffusing sheet and/or colored sheet satisfy a specific formula (1), a light transmission sheet can be realized which has good color reproduction while suppressing a lowering in light transmittance.

A screen comprising this light transmission sheet is particularly suitable, for example, for single light source-type transmission projection televisions.

BEST MODE FOR CARRYING OUT THE INVENTION

In the present invention, it is important that the light diffusing sheet comprising light diffusing fine particles dispersed in a light transparent matrix and/or the colored sheet satisfy formula (1):

$$-0.5\% \leq T1-T2 \leq 5\% \tag{1}$$

wherein T1 represents light transmittance at a wavelength of 450 nm, %; and T2 represents light transmittance at a wavelength of 600 nm, %.

In this case, the transmittance is specifically a value as measured with a spectrophotometer.

In the present invention, the light transparent matrix may be any one so far as it has high transmittance as an optical member. Specific examples of preferred light transparent matrixes include acrylic polymers, styrene polymers, polycarbonates, polyesters, and copolymers of two or more thereof.

When T1−T2 is less than −0.5%, the color temperature is unsatisfactory and the object of the present invention cannot be attained. On the other hand, when T1−T2 exceeds 5%, the color temperature is satisfactory. In this case, however, disadvantageously, in some cases, satisfactory transmittance and good color reproduction cannot be provided without difficulties.

One specific method for satisfying formula (1) is to incorporate a wavelength-selective colorant, specifically a blue colorant. A method may also be adopted in which a plurality of colorants different from each other in type, properties and the like are used in combination and the mixing ratio thereof is regulated.

The blue colorant may be any dye, pigment and the like so far as it satisfies formula (1). Preferred examples thereof include ultramarine dyes. Colorants suitable for the present invention include, for example, ultramarine (stock number 1900) manufactured by Daiichi Kasei Co., Ltd.

The amount of the blue colorant added is 0.003 to 0.05 part by weight, preferably 0.03 to 0.01 part by weight, based on 100 parts by weight of the light transparent matrix. As the amount of the blue colorant incorporated increases, the color temperature is likely to rise. In this case, however, the transmittance is lowered by the amount of the blue colorant. Therefore, the amount of the blue colorant incorporated is preferably as small as possible in an amount range satisfying formula (1).

Another method for satisfying formula (1) is to select and use light diffusing fine particles incorporated in the light transparent matrix so as to satisfy formula (1). The light diffusing fine particles to be incorporated may be of one type. Alternatively, a plurality of types of light diffusing fine particles different from each other in type, size, shape, and optical properties may be used in combination. A blue colorant may further be incorporated.

In the present invention, for example, in the light diffusing fine particles contained in the light transparent matrix, at least one type thereof may be constituted by inorganic fine particles. Particularly preferred inorganic fine particles include silica-based glass beads. Magnesium carbonate, magnesium sulfate and the like may also be used. Even when only glass beads are used, formula (1) can be satisfied. However, combined use of glass beads and organic crosslinked beads, for example, acrylic beads and acryl-styrene copolymer beads, is also possible. When both the materials are used in combination, in general, the proportion of the glass beads is preferably set to not less than 50% by weight from the viewpoint of satisfying formula (1). The diameter of the glass beads is preferably 1 to 30 µm, particularly preferably 5 to 20 µm.

The light transmission sheet according to the present invention satisfying formula (1) may be used in various applications. In this case, the light transmission sheet can be properly fabricated so as to suit for particular applications. For example, the light transmission sheet according to the present invention can be used for light transmission screens, particularly for light transmission screens for projection televisions. Further, proper transparent or semi-transparent lenses may be provided on the whole or a part of one side or both sides of the light transmission sheet according to the present invention. Specific examples of preferred transparent lenses which may be provided on the light transmission sheet include lenticular lenses and Fresnel lenses. The light diffusing sheet according to the present invention per se may be fabricated into a lenticular shape for use as a light diffusing lenticular lens. Further, the light diffusing sheet may also be used as a flat front panel which is further provided on a lenticular lens in its viewer side without providing lenses or the like.

The light diffusing sheet and/or the colored sheet according to the present invention can be used in various applications and are particularly suitable for conventional screens, for example, light transmission screens, particularly screens for single light source-type transmission projection televisions.

EXAMPLES

Next, the present invention will be described in more detail with reference to the following specific examples.

Examples 1 to 9 and Comparative Examples 1 and 2

Conditions for individual examples of the present invention and comparative examples of the prior art for comparison with the examples, and the results of measurement of color temperature are shown in Tables 1 and 2.

The light diffusing sheets and/or the colored sheets were formed according to the following procedure.

Light diffusing fine particles or a blue colorant in an amount (parts by weight) specified in Table 1 were added to 100 parts by weight of a light transparent matrix of an acryl/styrene copolymer resin (tradename: MS600, manufactured by Nippon Steel Chemical Co., Ltd.). The mixture was formed into a 2 mm-thick flat sheet with an extruder for the production of a Fresnel lens. Thereafter, the surface of the flat sheet was shaped into a Fresnel lens to form a Fresnel lens sheet. A 1 mm-thick lenticular lens sheet formed of a material of a light diffusing fine particle-free acrylic resin (tradename MH, manufactured by Sumitomo Chemical Co., Ltd.) containing or not containing a blue colorant was disposed on the Fresnel lens sheet in its viewer surface side to constitute a transmission screen. This transmission screen was mounted on a screen of a 50-inch rear projection-type projection television with a liquid crystal light source. White light was projected on this screen, and the color temperature was measured at a distance of 2 m from the screen.

On the other hand, the center part of each of the Fresnel lens sheets prepared above was cut out and was measured for transmittance at 450 nm and 600 nm with a spectrophotometer (tradename: UV-2450, manufactured by Shimadzu Seisakusho Ltd.). The results were as shown in Tables 1 and 2. The criteria of the evaluation in Table 2 were as follows.

⊙: Very good

○: Good

X: Failure

As a result, unlike the sample of Comparative Example 1 using only organic crosslinked beads as light diffusing fine particles, the samples of the examples of the present invention using the blue colorant or inorganic fine particles so as to satisfy formula (1) could achieve a color temperature of 10,000 K or above, indicating good color reproduction

TABLE 1

| | Lenticular lens | | | | | | Fresnel lens | | |
|---|---|---|---|---|---|---|---|---|---|
| | Light transparent matrix | Blue colorant | | Transmittance | | | Light transparent matrix | Light diffusing fine particles 1 | |
| | Name of product | Name of product | pts. wt. | T1 (450 nm) | T2 (600 nm) | ΔT T1 − T2 | Name of product | Name of product | pts. wt. |
| Ex. 1 | MH | None | — | 91.5 | 92 | −0.5 | MS600 | SM10X-12JH | 1.8 |
| Ex. 2 | MH | None | — | 91.5 | 92 | −0.5 | MS600 | SM10X-12JH | 1.8 |
| Ex. 3 | MH | None | — | 91.5 | 92 | −0.5 | MS600 | SM10X-12JH | 1.8 |
| Ex. 4 | MH | None | — | 91.5 | 92 | −0.5 | MS600 | SM10X-12JH | 0.9 |
| Ex. 5 | MH | None | — | 91.5 | 92 | −0.5 | MS600 | SM10X-12JH | 0.6 |
| Ex. 6 | MH | None | — | 91.5 | 92 | −0.5 | MS600 | EMB-20 | 1.8 |
| Ex. 7 | MH | Ultramarine blue | 0.01 | 89 | 87.5 | 1.5 | MS600 | SM10X-12JH | 1.8 |
| Ex. 8 | MH | Ultramarine blue | 0.02 | 87 | 82 | 5 | MS600 | SM10X-12JH | 1.8 |
| Ex. 9 | MH | Ultramarine blue | 0.006 | 89.5 | 89.5 | 0 | MS600 | SM10X-12JH | 1.8 |
| Comp. Ex. 1 | MH | None | — | 91.5 | 92 | −0.5 | MS600 | SM10X-12JH | 1.8 |
| Comp. Ex. 2 | MH | None | — | 91.5 | 92 | −0.5 | MS600 | SM10X-12JH | 1.8 |

| | Fresnel lens | | | | | | |
|---|---|---|---|---|---|---|---|
| | Light diffusing fine particles 2 | | Blue colorant | | Transmittance | | |
| | Name of product | pts. wt. | Name of product | pts. wt. | T1 (450 nm) | T2 (600 nm) | ΔT T1 − T2 |
| Ex. 1 | None | — | Ultramarine blue | 0.005 | 87 | 85.5 | 1.5 |
| Ex. 2 | None | — | Ultramarine blue | 0.01 | 85 | 80 | 5 |
| Ex. 3 | None | — | Ultramarine blue | 0.003 | 87.5 | 87.5 | 0 |
| Ex. 4 | EMB-20 | 0.9 | None | — | 87 | 87 | 0 |
| Ex. 5 | EMB-20 | 1.2 | None | — | 87 | 86 | 1 |
| Ex. 6 | None | — | None | — | 87 | 84.5 | 2.5 |
| Ex. 7 | None | — | None | — | 89.5 | 90 | −0.5 |
| Ex. 8 | None | — | None | — | 89.5 | 90 | −0.5 |
| Ex. 9 | None | — | None | — | 89.5 | 90 | −0.5 |
| Comp. Ex. 1 | None | — | None | — | 88 | 90 | −2 |
| Comp. Ex. 2 | None | — | Ultramarine blue | 0.012 | 83 | 77 | 6 |

MH: manufactured by Sumitomo Chemical Co., Ltd.
MS600: manufactured by Nippon Steel Chemical Co., Ltd.
SM10X-12JH: manufactured by Sekisui Plastic Co., Ltd.
EMB-20: manufactured by Potters-Ballotini Co., Ltd.

TABLE 2

| | Lenticular + Fresnel Transmittance | | | | Evaluation | | |
|---|---|---|---|---|---|---|---|
| | T1 (450 nm) | T2 (600 nm) | ΔT T1 − T2 | ΔK | Transmittance | Color temperature | Overall |
| Ex. 1 | 79.6 | 78.7 | 0.9 | 10520 | ⊙ | ○ | ○ |
| Ex. 2 | 77.8 | 73.6 | 4.2 | 11490 | ○ | ⊙ | ○ |
| Ex. 3 | 80.1 | 80.5 | −0.4 | 10206 | ⊙ | ○ | ○ |
| Ex. 4 | 79.6 | 80.0 | −0.4 | 10200 | ⊙ | ○ | ○ |
| Ex. 5 | 79.6 | 79.1 | 0.5 | 10362 | ⊙ | ○ | ○ |

TABLE 2-continued

|  | Lenticular + Fresnel Transmittance | | | | Evaluation | | |
| --- | --- | --- | --- | --- | --- | --- | --- |
|  | T1 (450 nm) | T2 (600 nm) | ΔT T1 − T2 | ΔK | Transmittance | Color temperature | Overall |
| Ex. 6 | 79.6 | 77.7 | 1.9 | 11110 | ◉ | ○ | ○ |
| Ex. 7 | 79.7 | 78.8 | 0.9 | 10520 | ◉ | ○ | ○ |
| Ex. 8 | 77.9 | 73.8 | 4.1 | 11490 | ○ | ◉ | ○ |
| Ex. 9 | 80.1 | 80.6 | −0.4 | 10206 | ◉ | ○ | ○ |
| Comp. Ex. 1 | 80.5 | 82.8 | −2.3 | 9160 | ◉ | X | X |
| Comp. Ex. 2 | 75.9 | 70.8 | 5.1 | 12530 | X | ◉ | X |

MH: manufactured by Sumitomo Chemical Co., Ltd.
MS600: manufactured by Nippon Steel Chemical Co., Ltd.
SM10X-12JH: manufactured by Sekisui Plastic Co., Ltd.
EMB-20: manufactured by Potters-Ballotini Co., Ltd.

The invention claimed is:

1. A light transmission sheet comprising: (1) a light diffusing sheet comprising light diffusing fine particles dispersed in a light transparent matrix and/or (2) a colored sheet comprising a wavelength-selective colorant dispersed in a light transparent matrix, at least one type of said light diffusing fine particles contained in said light diffusing sheet being inorganic fine particles, said light diffusing sheet and/or said colored sheet satisfying formula (1):

$$-0.5\% \leq T1 - T2 \leq 5\% \quad (1)$$

wherein T1 represents light transmittance at a wavelength of 450 nm, %; and T2 represents light transmittance at a wavelength of 600 nm, %.

2. A light transmission sheet for a screen, comprising (i) the light diffusing sheet and/or the colored sheet according to claim 1 and (ii) a Fresnel lens provided on the whole or a part of at least one side of the light diffusing sheet and/or the colored sheet.

3. A light transmission sheet for a screen as a lenticular lens, comprising the light diffusing sheet and/or the colored sheet according to claim 1.

4. A screen comprising the light transmission sheet for a screen according to claim 3.

5. A light transmission sheet for a screen, comprising the light diffusing sheet and/or the colored sheet according to claim 1, the light diffusing sheet and/or the colored sheet being provided on the surface of a lenticular lens in its viewer side.

6. A light transmission sheet for a front panel, comprising the light diffusing sheet and/or the colored sheet according to claim 1, the light diffusing sheet and/or the colored sheet being further provided on the front surface of a lenticular lens.

* * * * *